United States Patent
Li et al.

(10) Patent No.: US 6,497,489 B1
(45) Date of Patent: Dec. 24, 2002

(54) PROJECTOR WITH GUIDING RIB IN VENT

(75) Inventors: Chang-Chien Li, Hsin-Chuang (TW); Chih-Kang Peng, Tao-Yuan (TW); Yu-Hou Tsao, Taipei (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/682,397

(22) Filed: Aug. 29, 2001

(51) Int. Cl.⁷ .......................... G03B 21/18; G03B 21/22
(52) U.S. Cl. ........................ 353/61; 353/57; 353/119
(58) Field of Search ........................ 353/119, 57, 60, 353/61

(56) References Cited

U.S. PATENT DOCUMENTS 6,132,049 A * 10/2000 Yamaguchi et al. .......... 353/61
6,254,238 B1 * 7/2001 Takamatsu ................... 353/61
6,334,686 B1 * 1/2002 Shiraishi et al. .............. 353/57
6,422,703 B1 * 7/2002 Wang et al. .................. 353/61
6,443,575 B1 * 9/2002 Miyamoto et al. ........... 353/58

* cited by examiner

Primary Examiner—Russell Adams
Assistant Examiner—Melissa J. Koval
(74) Attorney, Agent, or Firm—Winston Hsu

(57) ABSTRACT

A projector has a housing, a light source positioned within the housing to generate light, a fan positioned beside the light source to dissipate heat generated by the light source, and an air vent positioned beside the fan to guide heat out of the housing. The air vent reduces turbulence, and thus noise, by the addition of at least one guiding rib. The guiding rib causes heat to flow fluently through the air vent and out of the housing.

9 Claims, 4 Drawing Sheets

PROJECTOR WITH GUIDING RIB IN VENT

BACKGROUND OF INVENTION

1. Field of the Invention

The present invention relates to a projector, and more particularly, to a projector with a vent that has a guiding rib.

2. Description of the Prior Art

Projectors are common devices used for displaying still images or motion videos onto a screen. As a result, projectors are widely used in businesses to make presentations, or to facilitate training. To accomplish these ends, the projectors have some form of light-emitting source. Please refer to FIG. 1, which is a diagram of a prior art projector 10. The projector 10 comprises a housing 11, a light source 12 installed in the housing 11, a fan 13 installed on the housing 11, and an air vent 14 installed next to the fan 13. Typically, the light source 12, in addition to producing light, also generates a significant amount of heat. So as to avoid damaging the projector 10, the light source 12 is equipped with the fan 13 and the air vent 14. The fan 13 and the air vent 14 together facilitate radiation of heat away from the light source 12, and out of the housing 11.

One shortcoming of the prior art projector 10 lies in the design of the air vent 14. Because the air vent 14 is curved, heat flowing in the air vent 14 exhibits turbulence, which slows heat flow in the air vent 14, and reduces the ability of the projector 10 to dissipate heat. Furthermore, the turbulence generates noise, which reduces audibility of the presenter, and affects audio quality in a case of taping the presentation.

SUMMARY OF INVENTION

It is therefore an objective of the present invention to provide a projector with an improved air vent that increases heat dissipation, and reduces noise caused by turbulence in the air vent.

Briefly, a projector according to the claimed invention comprises a housing, a light source positioned within the housing, a fan positioned beside the light source to dissipate heat from the light source, and an air vent positioned beside the fan to direct heat away from the housing. The air vent comprises at least one guiding rib for guiding the heat so as to increase a flow rate of the heat through the air vent.

It is an advantage of the present invention that the guiding rib in the air vent of the projector increases a flow of heat in the air vent, which increases heat dissipation, and reduces noise.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
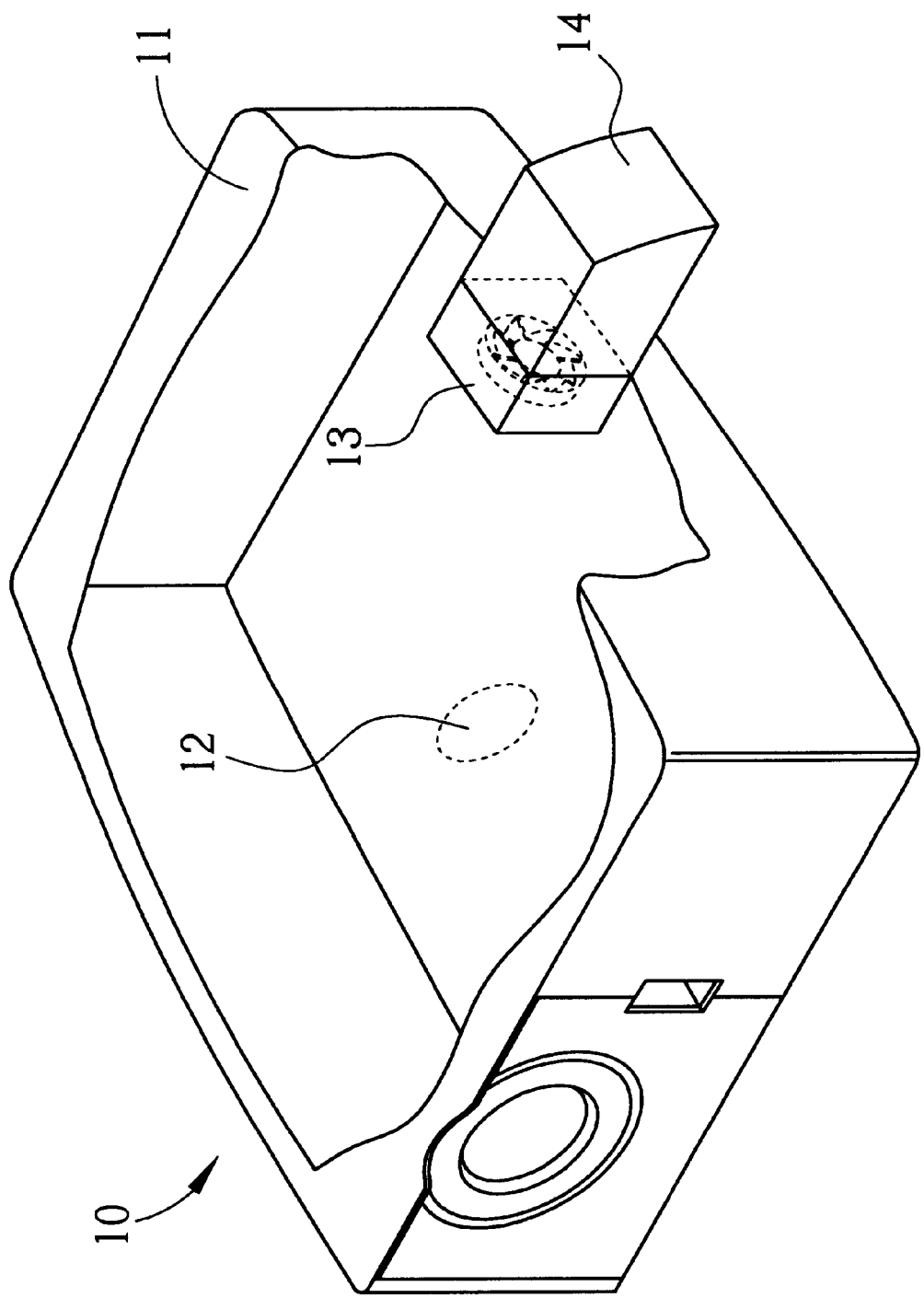
FIG. 1 is a diagram of a projector according to the prior art.
Figure 2:
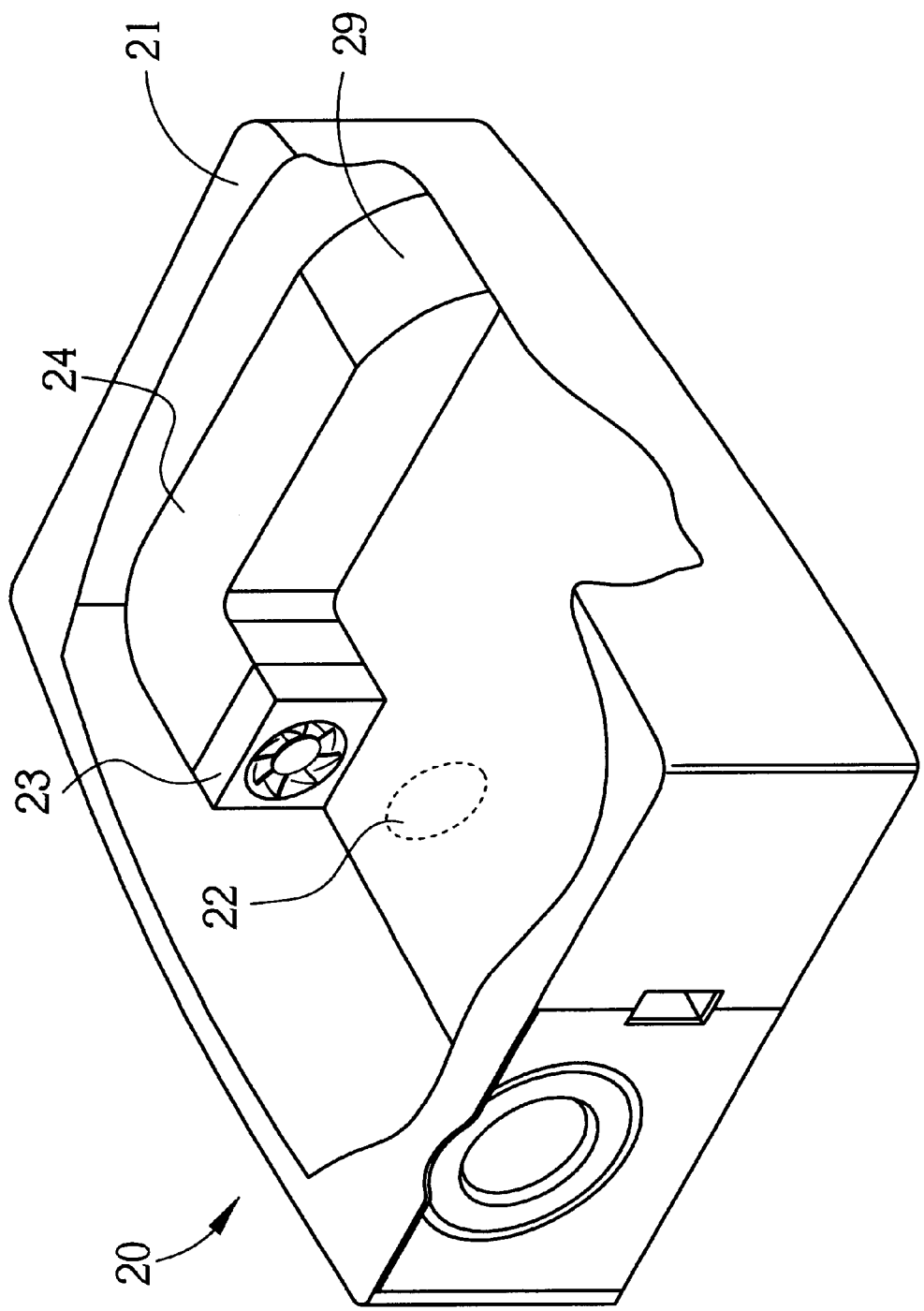
FIG. 2 is a diagram of a projector according to the present invention.
Figure 3:
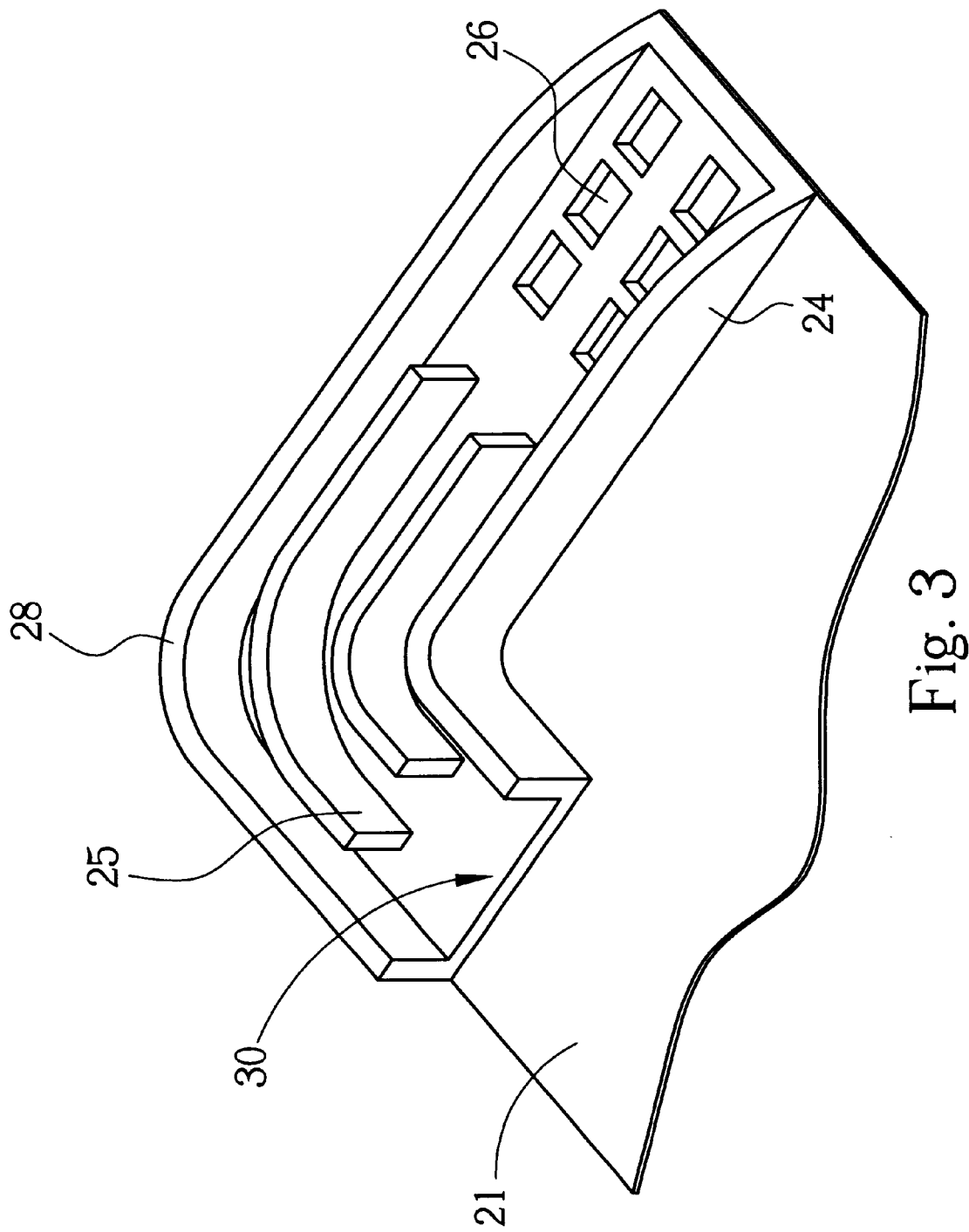
FIG. 3 is a diagram of an air vent of the projector of FIG. 2.

Please refer to FIG. 2, which is a diagram of a projector 20 according to the present invention. The projector 20 is used to project an image onto a screen. The projector 20 comprises a housing 21, a light source 22 positioned in the housing 21, a fan 23 positioned beside the light source 22, and an air vent 24 positioned beside the fan 23. As shown in FIG. 3, the air vent 24 comprises at least one guiding rib 25 vertically extended inside the air vent 24, an internal opening 30 formed inside the housing 21, and a plurality of outer openings 26 formed on a bottom side of the air vent 24.

The light source 22 generates light, and heat. To avoid damage to the projector 20 resulting from accumulation of heat generated by the light source 22, the heat is dissipated from the light source 22 by an airflow generated by the fan 23. The airflow then enters the air vent 24, where it is guided by the guiding rib 25, and leaves the air vent 24 through the plurality of downward-facing holes 26. The guiding rib 25 essentially divides the large gap in the air vent 24 to a plurality of smaller gaps, which reduces turbulence of the airflow, and speeds up heat dissipation.

To further facilitate the airflow in the air vent 24, a portion 29 (shown in FIG. 2) of the air vent 24 above the plurality of holes 26 has a shape that curves downward toward the plurality of holes 26, which also face downward.

The guiding rib 25 itself is also shaped with a curve that is substantially similar to a curve of a sidewall 28 of the air vent 24. The guiding rib 25 is also approximately parallel with the sidewall 28. This arrangement of the guiding rib 25 in relation to the sidewall 28 causes air to flow more fluently through the air vent 24. Please note, however, that the shape of the guiding rib 25 is not limited to this configuration, and that straight or unparallel configurations are also anticipated by the present invention.

It should be noted that the present invention projector includes configurations with the air vent 24 located inside the housing 21, and with the air vent 24 located outside of the housing 21. For the configuration where the air vent 24 is located outside of the housing 21, the holes can be pointed toward a wall that absorbs sound, to further reduce noise.

Further, the fan 23 and air vent 24 are not necessarily configured as shown in FIG. 2. For instance, the fan 23 can be installed inside, or even outside, the housing 21, rather than being installed beside the light source 22, and the holes 26 also need not face downward. In fact, as long as the fan 23 and the air vent 24 are capable of dissipating heat generated by the projector 20, any modification of the shown configuration should be included within the present invention.

Figure 4:
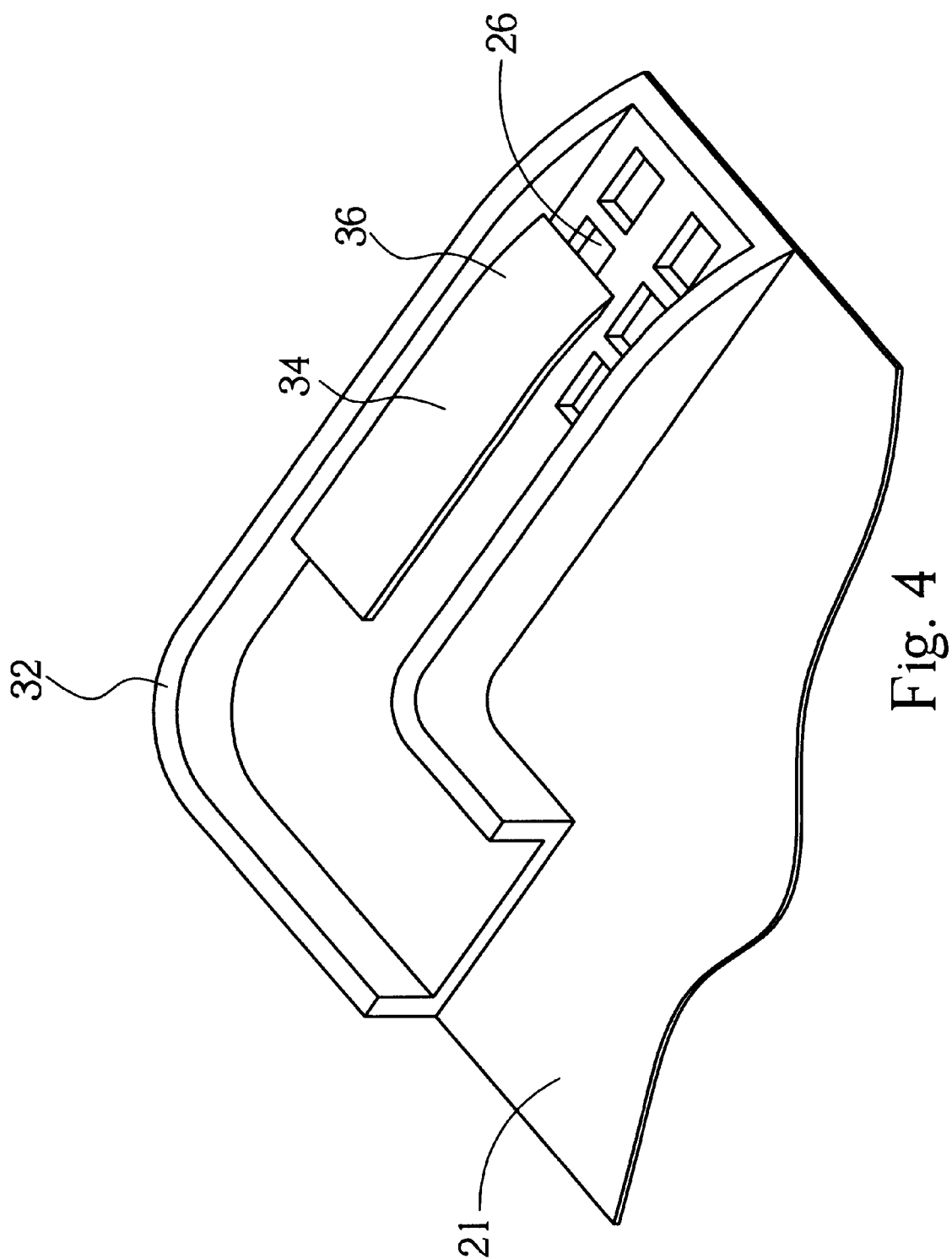
FIG. 4 is a diagram of a second embodiment of the air vent of the projector of FIG. 2.

Please refer to FIG. 4, which shows a second embodiment of the air vent 32 of the projector 20 of FIG. 2. The air vent 32 comprises a horizontally configured guiding rib 34. A portion 36 of the guiding rib 34 curves downward above the outer openings 26, such that the curved shaped rib portion 36 guides the airflow to flow from a horizontal direction to a downward direction.

Additionally, it should be noted that the guiding rib of the present invention is not limited to above horizontal and vertical configurations. As long as the guiding rib is capable of guiding the airflow, any modification of extended direction of the guiding rib should also be anticipated by the present invention. Compared to the prior art, the present invention projector, and particularly the air vent of the projector, greatly increases heat flow, and thereby dissipation, and generates significantly less noise. This is a result of the guiding ribs positioned within the air vent, and the curvature of the air vent above the plurality of holes, both of which improves heat flow through the air vent, greatly reducing the turbulence commonly found in the prior art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projector for projecting an image on to a screen comprising:

a housing;

a fan configured for dissipating heat generated by the projector;

an air vent comprising at least one opening formed on a wall of the air vent, each opening directly connecting the air vent to the outside of the projector housing, and a curved portion formed above the opening on a wall opposite the wall containing the opening so as to guide heat dissipated by the fan through the air vent and out of the housing; and at least one guiding rib installed inside the air vent for guiding heat so as to increase a flow rate of heat within the air vent.

2. The projector of claim 1 wherein the air vent is installed inside the housing.

3. The projector of claim 1 wherein the air vent is installed outside the housing.

4. The projector of claim 1 wherein the guiding rib is curved corresponding to curvature of the air vent so as to fluently guide heat inside the air vent.

5. The projector of claim 1 further comprising a light source installed inside the housing for generating light wherein the fan is installed beside the light source for dissipating heat generated by the light source.

6. A projector comprising:

a housing;

an air vent, the air vent comprising an internal opening and an outer opening, the internal opening formed inside the housing and the outer opening formed on the housing on a wall of the air vent, the air vent further comprising a curved shaped vent portion formed above the outer opening on a wall opposite the wall containing the outer opening, the curved shaped vent portion guiding airflow to the outer opening;

a fan disposed on the internal opening for generating an airflow flowing through the air vent and the airflow finally flowing out of the housing through the outer opening; and a guiding rib formed inside the air vent for guiding the airflow so as to increase a flowing speed of the airflow flowing from the internal opening toward the outer opening.

7. The projector of claim 6 wherein the outer opening is formed on a bottom surface of the housing.

8. The projector of claim 6 wherein the guiding rib is horizontally extended inside the air vent, and the guiding rib has a curved shaped rib portion formed above the outer opening, the curved shaped rib portion guiding the flowing direction of the airflow from horizontal to downward.

9. The projector of claim 6 wherein the air vent comprises a sidewall, the guiding rib is vertically extended inside the air vent, both the sidewall and the guiding rib are substantially shaped in same curve, and the sidewall and the guiding rib are substantially parallel to each other.

* * * * *